(12) United States Patent
Canoy

(10) Patent No.: US 8,212,723 B2
(45) Date of Patent: Jul. 3, 2012

(54) METHOD AND APPARATUS FOR DETERMINING AT A PREDETERMINED GRANULARITY THE DIRECTION AND RANGE OF A TRANSMITTING MOBILE DEVICE

(75) Inventor: Michael-David N. Canoy, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 157 days.

(21) Appl. No.: 12/547,424

(22) Filed: Aug. 25, 2009

(65) Prior Publication Data

US 2010/0052989 A1 Mar. 4, 2010

Related U.S. Application Data

(60) Provisional application No. 61/092,220, filed on Aug. 27, 2008.

(51) Int. Cl.
*G01S 3/02* (2006.01)
(52) U.S. Cl. ............................................. 342/458
(58) Field of Classification Search .................. 342/458
See application file for complete search history.

(56) References Cited

U.S. PATENT DOCUMENTS

| 2001/0000959 A1* | 5/2001 | Campana, Jr. ............ 340/573.1 |
| 2005/0270234 A1 | 12/2005 | Wolf et al. |
| 2007/0197229 A1 | 8/2007 | Kalliola et al. |
| 2007/0258421 A1 | 11/2007 | Alizadeh-Shabdiz et al. |
| 2008/0036653 A1 | 2/2008 | Huston |
| 2008/0208467 A1 | 8/2008 | Ruckart |
| 2008/0287415 A1* | 11/2008 | Kelly et al. ............... 514/210.21 |
| 2009/0287415 A1* | 11/2009 | Buerger et al. ............... 701/300 |

FOREIGN PATENT DOCUMENTS

| DE | 10063971 | 7/2002 |
| WO | WO0163315 | 8/2001 |
| WO | WO2006083474 | 8/2006 |
| WO | WO2007031844 | 3/2007 |

OTHER PUBLICATIONS

International Search Report—PCT/US09/055222—International Search Authority, European Patent Office, Aug. 16, 2010.
Partial International Search Report—PCT/US09/055222, International Searching Authority.
European Patent Office, Jan. 4, 2001.
Written Opinion—PCT/US2009/055222—International Search Authority European Patent Office—Aug. 16, 2010,

* cited by examiner

*Primary Examiner* — Harry Liu

(57) ABSTRACT

Systems and methods for determining a direction and range, at a predetermined level of granularity, for a transmitting device in a communications system are presented. Determinations, based on indicia related to the signal conditions, information contained in the received signals, and/or inferences surrounding the transmission conditions can be employed in identifying a transmitter, determining the range and direction of a transmitter and/or identifying a relative location of a transmitter without relaying, retransmitting, and/or conveying the transmitted and received signal across a supporting communications network. These determinations can be formed centrally at the transmitting or receiving user equipment or mobile device or formed in a distributed manner between the transmitting and receiving user equipment or mobile devices across a communications system.

33 Claims, 12 Drawing Sheets

METHOD AND APPARATUS FOR DETERMINING AT A PREDETERMINED GRANULARITY THE DIRECTION AND RANGE OF A TRANSMITTING MOBILE DEVICE

CLAIM OF PRIORITY UNDER 35 U.S.C. §119

This application claims the benefit of U.S. Provisional Patent Application No. 61/092,220, entitled METHOD AND APPARATUS FOR DETERMINING AT A PREDETERMINED GRANULARITY THE DIRECTION AND RANGE OF A TRANSMITTING MOBILE DEVICE, and filed on Aug. 27, 2008, the entirety of which is incorporated herein by reference.

BACKGROUND

1. Field

The present invention relates generally to communication, and more specifically to techniques for determining a range and direction for a transmitting component from a receiving component in a communication system at a predetermined level of granularity.

2. Background

Communication systems are widely deployed to provide various communication services such as voice, packet data, and so on. These systems can be multiple-access systems capable of supporting communication with multiple users simultaneously by sharing the available system resources. Examples of such multiple-access systems include Code Division Multiple Access (CDMA) systems, Time Division Multiple Access (TDMA) systems, Frequency Division Multiple Access (FDMA) systems, and Orthogonal Frequency Division Multiple Access (OFDMA) systems.

Generally, user equipment (UE) or mobile devices in these systems communicate to other UE or mobile devices in the system by first communicating to a base station. This base station is in turn communicatively coupled through a network to a base station (either the same or a different base station) which transmits a signal that can be received by another UE or mobile device to complete one leg of a communications circuit. A return leg can be similarly established through the base station and network. Conventionally, communications systems can incorporate the transmission of UE or mobile device location information into the transmitted signals. For example, GPS location information can be included allowing for identification of the transmitting UE or mobile device based on the communicated GPS information.

These conventional systems generally do not communicate directly between UE or mobile devices, e.g., without the use of the base station or corresponding network. Further, these conventional systems typically rely specifically on relatively fine grained affirmative location information being transmitted by devices through the base station and network to the receiving device. This can require costly equipment and circuitry to analyze the context of a UE or mobile device to deduce the location of said UE or mobile device such that it can then be encoded and transmitted over the conventional communications system to the receiving UE or mobile device (e.g., through base station and cell networks). These systems further congest communication networks by adding this fine grain location information to the network traffic. These systems do little for the average mobile device user who can desire to locate another mobile device user in a more direct and efficient manner.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

A radiated beacon or signal is provided with mobile devices to enable users to securely locate friends within a desired range or social network. For example, the beacon can be generated from cell phones or mobile devices to enable users to meet with other users of the system that are also attempting to locate persons using the respective devices. In one aspect, the beacon could use an unlicensed band for transmission, for example, or employ a licensed band if the interference level is not deemed tolerable. Each mobile phone in a user-defined network can be equipped with a beacon that only "friends" (or other social designation) can detect. Using the beacon, friends can be directed to the location of other friends. The beacon and related components can enforce a security contract between friends and can be employed to distinguish the friends from each other. The respective application processing the beacon can relay direction and proximity to the user that would aid in efficiently locating their collective friends.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Systems and methods are provided to enable users to automatically locate one another from predetermined and secure social networks. In one aspect, an apparatus is provided to facilitate determining the direction and range of a transmitting device at a predetermined level of granularity by processing a transmitted signal. The apparatus includes a receiving component for processing a beacon signal from a transmitting device. An analyzer determines a direction and range of the transmitting device based at least in part on an attenuation of the beacon signal, information contained in the beacon signal, or a context of the beacon signal.

Figure 1:
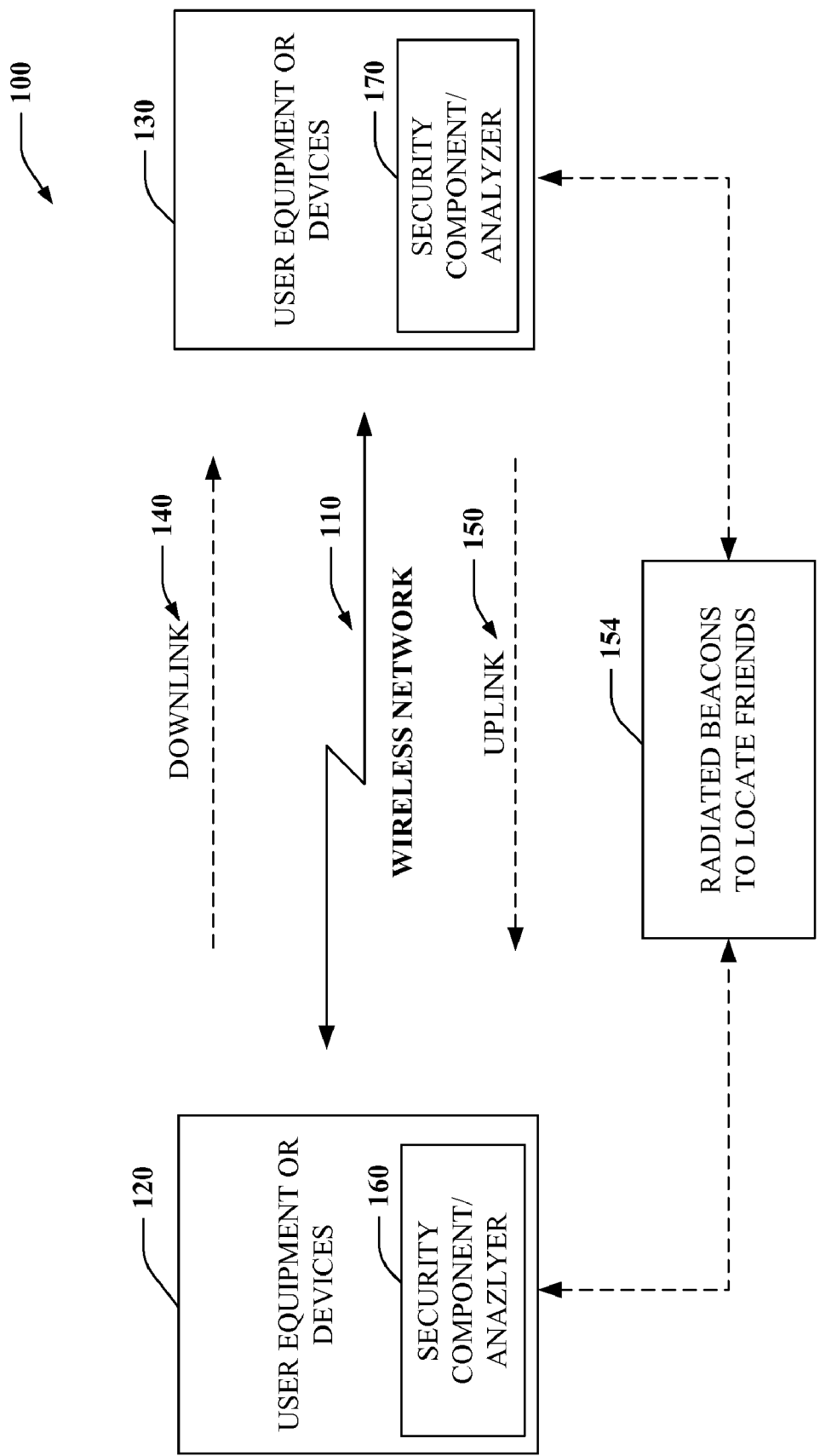
FIG. 1 illustrates a system for receiving a signal facilitating determining direction and range with a predetermined granularity.

Turning to FIG. 1, a system 100 is illustrated for receiving a signal facilitating determining direction and range with a predetermined granularity. The system 100 includes one or more user devices 120 which can be an entity capable of communication over a wireless network 110 to a second device 130 (or devices). For purposes or illustration, only two devices are shown in the system 100 but it is to be appreciated that a plurality of such devices can be employed in the network 110. For instance, each device 120, 130 can be an access terminal (also referred to as terminal, user equipment, mobility management entity (MME) or mobile device). Although not shown, a base station(s) can communicate to the devices 120, 130 via downlink 140 and receive data via uplink 150. Such designation as uplink and downlink is arbitrary as the devices 120 and 130 can also transmit data via downlink and receive data via uplink channels. It is noted that although two components 120 and 130 are shown, that more than two components can be employed on the network 110, where such additional components can also be adapted for the wireless processing described herein.

As shown, radiated beacons 154 are communicated between the devices 120 and 130 (and other devices) and are employed to help locate friends or other desired acquaintances. The beacons 154 can be configured by the respective devices 120, 130 via security components 160 and 170 (also referred to as analyzers) to only allow designated users to decode the beacons 154. Thus, a security contract or other encoded sequence can be configured to enable some devices to respond to the beacons 154 while non-entrusted devices are prevented from interpreting information generated from the beacons. The beacon 154 can be generated from cell phones or mobile devices to enable users to meet with other users of the system 100 that are also trying to locate persons using the device 120 or 130 in this example. In one aspect, the beacon 154 could use an unlicensed band for transmission, for example, or employ a licensed band if the interference level is not tolerable. Thus, each mobile device 120 or 130 in a user-defined network can be equipped with a beacon 154 that only "friends" (or other social network designation) can detect. Using the beacon 154, friends can be directed to the location of other friends. The beacon 154 and related components could enforce a security contract between friends and can be employed to distinguish the friends from each other. The respective application processing the beacon 154 such as the security components 160 and 170 could relay direction and proximity to the user that would aid in locating their collective friends within a desired network or range capable of receiving the beacon.

In general, the system 100 can employ a plurality of mobile devices each having a transmitter and/or receiver for transmission and/or reception of data between communication system components (e.g., between user equipment (UE), base station (BS or NodeB), mobile devices, . . . ). For example, a UE may transmit one or more data packets that can be received by other UE in a given transmission region, wherein the data packets can be include at least the user identification information (user ID), session identification information (session ID) and a ranging parameter.

This location information can be transmitted, for example, over a digitally encoded pilot channel to be received by, for example a receiving mobile device. The overall system can include a plurality of UE or mobile devices that can perform distance and ranging, the transmitting UE or mobile device, the receiving UE or mobile device, and the information transmitted and/or received that facilitates direction and ranging in the various aspects of the disclosed subject matter.

In an aspect, the system 100 can facilitate determining the direction and ranging of a transmitting UE or mobile device by receiving a signal from transmitted by said transmitting device. The signal can include a user ID, a session ID, and a ranging parameter which is described in more detail below. The ranging parameter can be in a block code. The user ID can facilitate the receiving UE or mobile device in determining an identity associated with the received signal transmitted by a transmitting UE or mobile device (e.g., the receiver can determine the identity of the mobile device being ranged).

In accordance with another aspect, the session ID can provide privacy to the transmitting device user. This can be achieved by encoding of the signal transmitted to secure the transmitted signal, for example, by hashing information with the session ID such that the session ID would typically be employed to decode the hash and determine the encoded information. Thus for example, the user ID can be hashed with the session ID to encode the user ID information being broadcast. Similarly, where a receiver of the signal has the session ID, the hash can easily be opened and the user ID rapidly determined. The session ID can be employed to facilitate improved privacy by being employed as a "key" as is well known in the data security arts and, as will be appreciated by one of skill in the art, is not so limited to the brief and simplistic examples given herein.

In accordance with another aspect, the ranging parameter can facilitate determining a range and direction of a transmitting device. In an embodiment, the ranging parameter can be a predetermined repeating code in block code. This can facilitate determining distance by analyzing the power of the received signal in comparison to a predetermined transmitted power level. For example, where a repeating code transmitted as block code is transmitted at a pre-set power level by devices in a system, the receiving device can determine the range and direction of the transmitting device at a predetermined granularity by analyzing the attenuation of the transmitted signal from the original transmitted level. Similarly, the ranging parameter can include a specification of the transmitted power level to facilitate determinations of signal level attenuation at the receiving device. For example, where a transmitting device broadcasts a transmitting power level as block code, the receiving device can determine the range and direction of the transmitting device based at least in part on the attenuation of the received signal in comparison to the transmit power level identified in the broadcast signal.

In accordance with another aspect, further encryption techniques can be employed to further secure the privacy and exclusivity of transmissions being employed to facilitate ranging and determining the direction of a transmitting device. These encryption techniques can include those currently well known in the art and/or those not yet identified (e.g., the particular encryption technique is not the subject of the disclosed subject matter, and as will be appreciated by one of skill in the art, where encryption techniques are germane to the systems, devices, and/or methods of the disclosed subject matter, incorporation of those techniques is within the scope of the disclosed subject matter.)

Moreover in accordance with another aspect, techniques such as frequency-hopping can be employed to both improve privacy/security and also to improve the performance of the system 100. By frequency hopping, it can become more difficult to track a single transmitting device without knowing the next hop frequency. This information can be encoded into the transmitted signal and can be decoded at the receiving device with the correct key. The key can be communicated to the receiving device by a nearly limitless number of methods and one of skill in the art will appreciate that all such methods of providing a key for decoding information are within the scope of the disclosed subject matter. Where a key is received, for example by being transmitted over a conventional cellular text messaging service, a frequency hopping transmitter can be tracked by the key holding receiving device across a predetermined frequency hopping process while a receiver without the key would find it nearly impossible to determine the next hop frequency and would not likely be able to successfully track the transmitting device.

Frequency hopping can also reduce signal noise as is well known in several closely related arts. This can improve overall system performance. For example, where a particular frequency is noisy, the direction and range analysis can be less precise where the communication remains on the noisy frequency. However, where the devices frequency hop, they are more likely to encounter some clear frequencies that can improve overall system and device performance. Further, frequency hopping can improve performance in systems having larger pluralities of transmitting and receiving devices by "flattening" the use of frequencies across the range of employed frequencies rather than compressing frequency usage into a few select frequencies within the range over time and number of signals.

In accordance with another aspect, the information transmitted (e.g., user ID, session ID, and ranging parameter) can be comprised in a data structure. The data structure can also be expanded to further include, for example, location parameters, transmitter context information, reference signal information, or a state ID, among other predetermined information. A location parameter can be information related to a current or last known location known to the transmitter and transmitted as part of the data structure to receiving devices. The location parameter can for example include GPS information, inertial computations of position, elevation information, or other location information related to the location of the transmitting device. The transmitter context (TX context) information can include relational positioning context of the transmitter. For example, the TX context information can include distance from one or more beacons with known locations (e.g., 10 feet from the beacon at the Statue of Liberty, 1 foot from the beacon at the entrance to the subway on $45^{th}$ and $15^{th}$, . . . ), acceleration information, or velocity information (e.g., communicating the change in direction and speed since the last broadcast transmission can facilitate identifying a trajectory of the transmitting device), among other similar forms of relational positioning information. The state ID can include information relating to the transmitting user's state (e.g., these can indicate "busy", "available", "working", "dining", . . . ).

In accordance with another aspect, a plurality of broadcast signals can be transmitted and/or received by UE or mobile devices 120 and 130. For example, a transmitting UE or mobile device can transmit one or more signals. Where there is a plurality of signals transmitted, the signals can be different from one another in a predetermined manner to facilitate determining a direction and range of the transmitting device at a receiving device. For example, where two signals are transmitted they can be at two frequencies, such that the first frequency may be more attenuated under certain conditions than the other frequency allowing direction and ranging at different transmission ranges (e.g., a 900 MHz signal will carry farther than a 5.8 GHz signal through concrete walls in a shopping center allowing determinations of direction and range more easily with the 900 MHz signal indoors.) As other examples, the phase of the signals could be shifted, the transmit power of the signals could be different, the signals could be transmitted from multiple antennas (e.g., like MIMO systems), among many other signal modifications that can facilitate improved performance that is germane to the disclosed subject matter. Similarly, modifications to the receiving system/device can also facilitate improvements, e.g., multiple receive antennas, etc.

In accordance with an aspect, determining a range can be by signal analysis. For example, determining a range in relation to the attenuation of a signal from a predetermined level in respect to known or inferred conditions (e.g., training or calibration), determining a range based at least in part on receiving one or more of a plurality of signals of known or inferred attenuation, determining a range based at least in part on frequency overlap between two signals, etc. Where a single receiver is employed, variable sampling rates can be employed to capture information from multiple bands. Where multiple receivers are employed, sampling can be ongoing for multiple bands in a concurrent manner. Further, determining range can be based on information communicated in the signals. For example, a general range can be determined based on the power of the received signals and a refinement can be made based on an indicator in the signal that the transmitter is near a coffee shop beacon (e.g., the transmitter can include information that it is near a coffee shop based on a beacon located at the coffee shop (such as an RFID at the entrance to the coffee shop)). Direction can be determined by the change of the received signal over time (e.g., as one closes on the transmitter, the signal can get stronger). Similarly, the direction can be determined by information contained in the signal (e.g., "near a coffee shop" can indicate a direction). Further, direction can be determined based on more complex analyses such as signal power level attenuation in a known environment (e.g., where a signal gets stronger and weaker between any two devices, and the environment is well characterized, changes in the attenuation can be mapped to the environment for determination of relatively precise range and direction information.)

In accordance with another aspect, ranging information can be relayed between devices and refer to external location markers. For example, a first user equipment can communicated to a second user equipment that the first user equipment is located at a distance and direction from an access point A. Upon receiving the location information, the second user equipment can determine the range and direction of the first user equipment based at least in part on the transmitted information and the range and direction of the second user equipment form the access point A. Thus, generally, user equipment can communicate information within the system relating to locations (e.g., ranges and directions) form known reference points, either stationary or moving (e.g., a reference point can be a set location such as an access point or can be a mobile reference point such as an additional user equipment in the system.)

The system 100 can include a receiving (RX) component (not shown) communicatively coupled to an antenna component (not shown) for receiving transmitted signals at least in part related to determining a direction and range of a transmitting device. The RX component can be communicatively coupled to a determination component (not shown) that can facilitate determining the direction and range of a transmitting device based at least in part on the signal received by the RX component. It is to be appreciated that the user devices described herein may employ a single antenna to communicate over the wireless network and/or to the respective social network. The devices could also include the employment of multiple antennas where one antenna was employed for general wireless communications and one or more other antennas were employed for the radiated beacons. As can be appreciated, substantially any type of device can be employed for wireless communications including white space devices such as television band devices or TVDB's.

In an aspect, the transmitted signal received by system 100 can include user ID, session ID, and at least a ranging parameter. The ranging parameter can be a block coded signal. The signal can be employed to determine a range by determining the level of attenuation of the signal. Further, the signal can comprise a data structure. The data structure can comprise the user ID, the session ID and the ranging parameter in combination with a state parameter, a location parameter, a transmission context information parameter, a reference signal, or combinations thereof. One or more signals can be transmitted and can be received by system 100 to facilitate determinations of direction and range. Frequency-hopping schema, as described herein, can be followed by system 100 to facilitate user security and privacy. Received signals can be encoded, encrypted, or some combination thereof, and where properly enabled, such signals can be decoded/decrypted by system 100 to facilitate determine direction and range.

Figure 2:
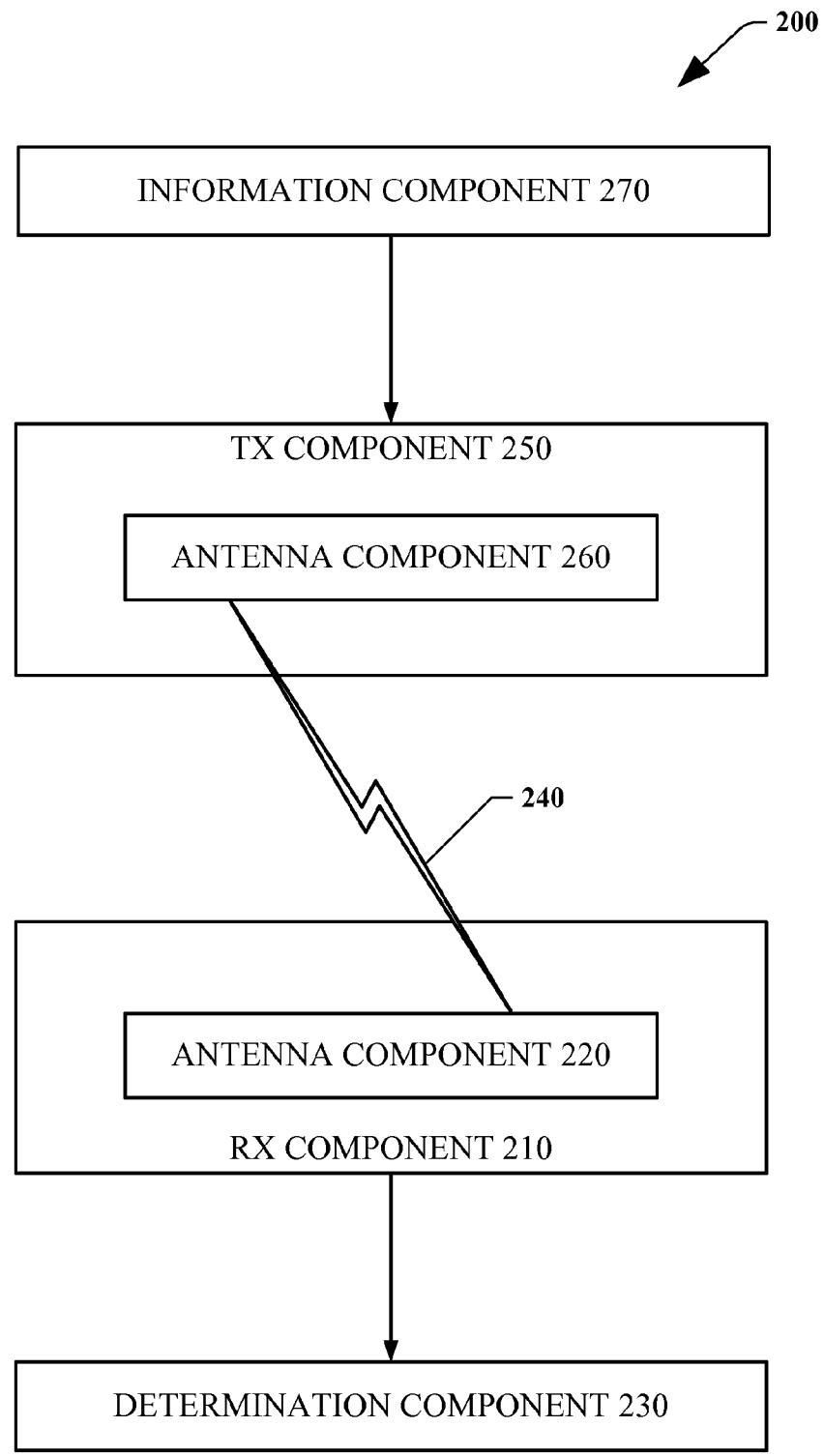
FIG. 2 illustrates a schematic diagram of a system for transmitting and receiving a signal facilitating determining direction and range with a predetermined granularity.

FIG. 2 illustrates a schematic diagram of a system 200 for transmitting and receiving a signal facilitating determining direction and range with a predetermined granularity. System 200 can comprise an RX component 210 having an antenna component 220 that can be the same as or similar to components 110 and 120 of FIG. 1 respectively. Similarly, system 200 can have a determination component 230 that can be the same as or similar to 130 of FIG. 1. Additionally, system 200 can comprise a transmission (TX) component 250 communicatively coupled to an antenna component 260 for transmitting one or more signals 240 to facilitate determining a direction and range of the TX component 250 relative to the RX component 210.

The content and structure of the signal transmitted by TX component 250 can be determined by information component 270 which can be communicatively coupled to TX component 250. By deduction, one of skill in the art will appreciate that a transmitting system (not separately illustrate) that is the corollary of system 100 can be comprised of a TX component 250, an antenna component 260, and information component 270 in the absence of the receiving components (e.g., 210, 220, and 230) or the actual transmitted signal 240.

Figure 3A:
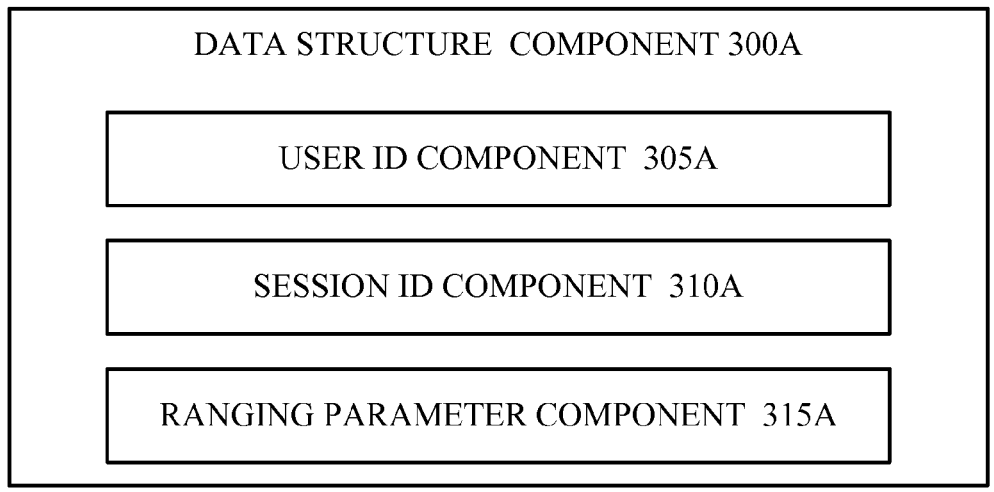
FIGS. 3A-3B illustrate a schematic diagram of data structures for facilitating determining direction and range with a predetermined granularity.
Figure 3B:
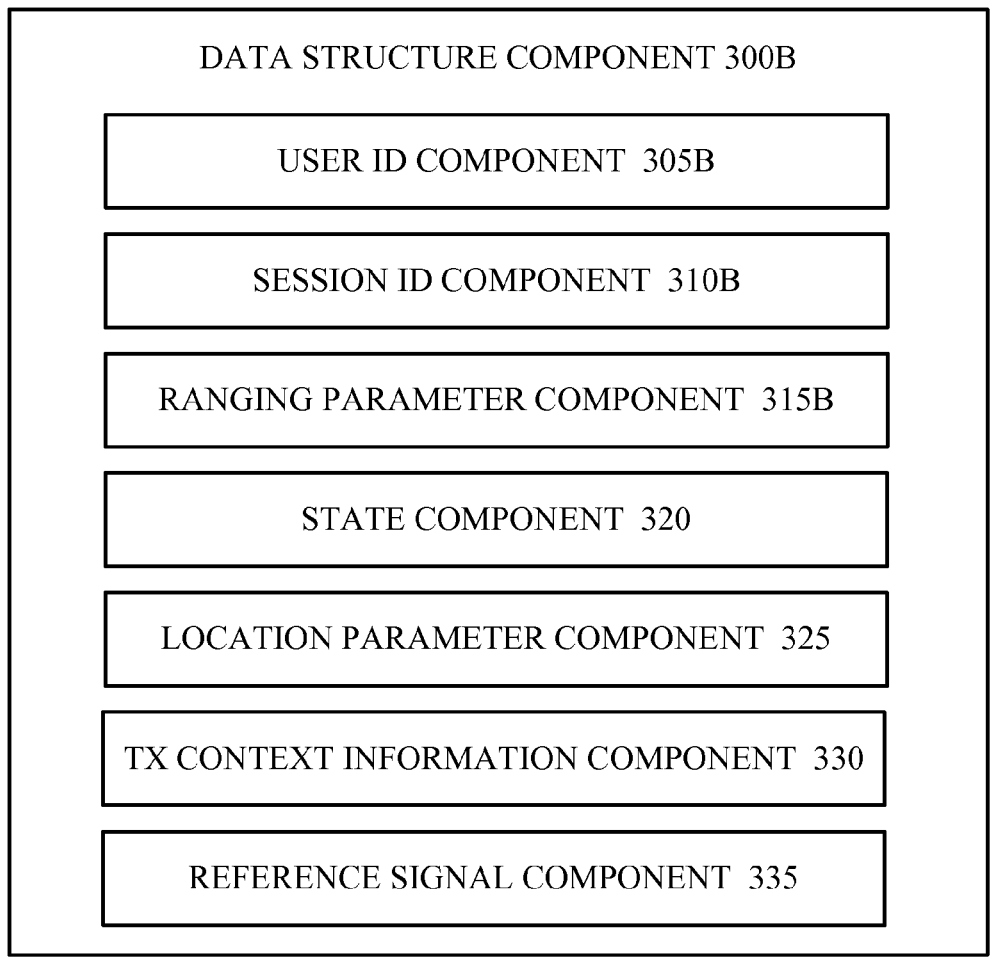

FIGS. 3A-3B illustrate a schematic diagram of data structures for facilitating determining direction and range with a predetermined granularity in accordance with an aspect of the disclosed subject matter. Data structure 300A can comprise a user ID component 305A, a session ID component 310A and a ranging parameter component 315A. As described herein, these components of the data structure can communicate sufficient information to facilitate determining the transmitters identity, provide a level of privacy to the transmitting party and provide both information to facilitate determining direction and range of the transmitting system.

Data structure 300B can be the same as or similar to data structure 300A. Data structure 300B can comprise a user ID component 305B, a session ID component 310B and a ranging parameter component 315B. As described herein, these components of the data structure can communicate sufficient information to facilitate determining the transmitters identity, provide a level of privacy to the transmitting party and provide both information to facilitate determining direction and range of the transmitting system. Further, data structure 300B can comprise a state component 320, a location parameter component 325, a TX context information component 330, a reference signal component 335, or a combination thereof. These additional datum can provide additional functionality as herein described.

Figure 4:
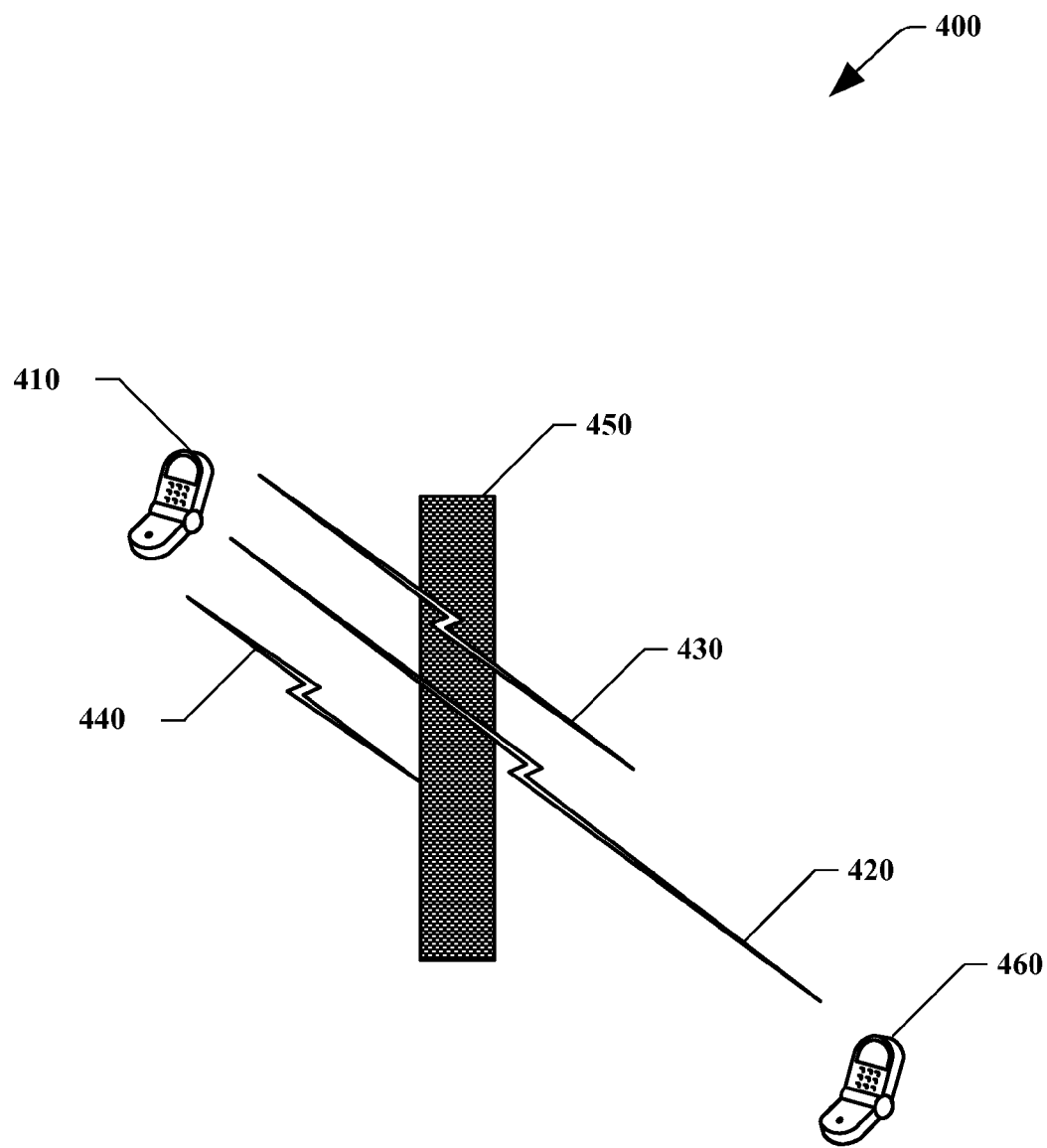
FIG. 4 illustrates a schematic diagram of a system with multiple transmissions for facilitating determining direction and range with a predetermined granularity.

FIG. 4 illustrates a schematic diagram of a system 400 with multiple transmissions for facilitating determining direction and range with a predetermined granularity in accordance with an aspect of the disclosed subject matter. System 400 illustrates two of a possible plurality of U.S. or mobile devices, 410 and 460 with an attenuator 450 disposed therebetween. The attenuator 450 is representative of various conditions, elements, and/or environments that can cause degradation and/or attenuation of a signal, 420-440 for example as here depicted, transmitted from U.S. 410 to UE 460 through attenuator 450. The figure illustrates that an attenuator can pass a transmitted signal 420. Signal 420 can therefore facilitate a determination of the direction and range of UE 410 from UE 460.

Similarly, attenuator 450 can hinder a transmitted signal 430. Signal 430 can reach UE 460 in a highly attenuated state that can still facilitate a determination of direction and range of UE 410 relative to UE 460. Where both signal 420 and signal 430 are received at UE 460, the combined information relating to at least the attenuation of the signals can be employed in distance and range determinations. Further, where the design of the signals (frequency overlap, beating, attenuation as a function of frequency, etc.) can provide further information. Attenuator 450 can also functionally block a transmitted signal 440 such that it does not reach UE 460 with sufficient power to be useful (e.g., signal to noise can be too low to rely on the reception of signal 440, etc.) All signals, as herein described, can contain data that can facilitate determinations of direction and range in addition to the attenuation information and/or signal structure correlations (beating, attenuation as a function of frequency, etc.) For example, the signal can be attenuated and also contain data indicating that the transmitter is near a coffee shop.

Figure 5:
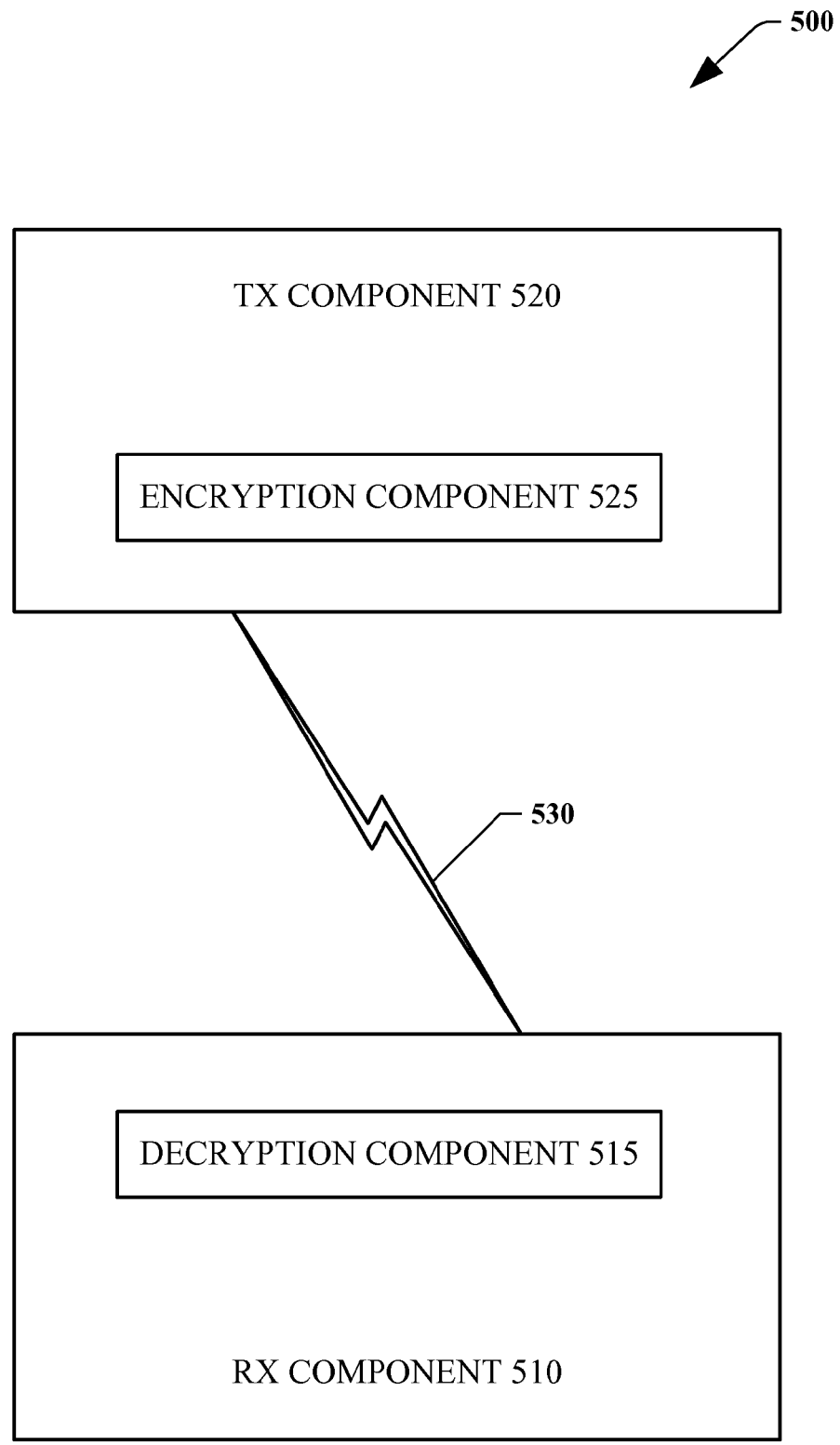
FIG. 5 illustrates a schematic diagram of a system employing data encryption in the system facilitating determining direction and range with a predetermined granularity.

FIG. 5 illustrates a schematic diagram of a system 500 employing data encryption in the system facilitating determining direction and range with a predetermined granularity in accordance with an aspect of the disclosed subject matter. System 500 can include a TX component 520 and a RX component 510 that can be the same as or similar to analogous component from systems 100, 200 and/or 300. TX and RX components 520 and 510 can communicate by transmitting signal 530. Signal 530 can be encrypted by an encryption component 525 and decrypted by a decryption component 515.

Figure 6:
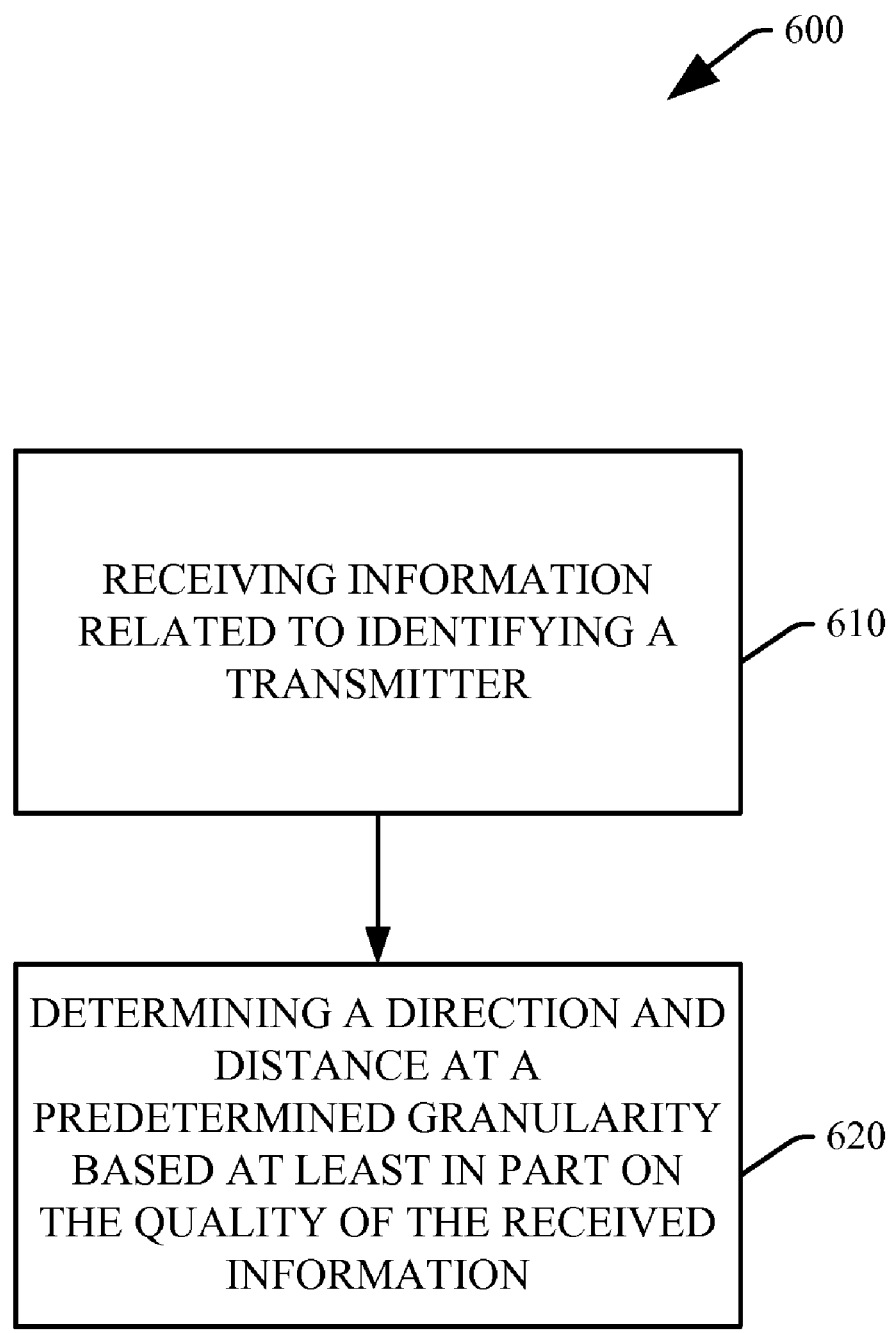
FIG. 6 illustrates a method to facilitate determining direction and range with a predetermined granularity.

FIG. 6 illustrates a method 600 to facilitate determining direction and range with a predetermined granularity in accordance with an aspect of the disclosed subject matter. At 610, information related to identifying a signal transmitter can be received. This signal can include a user ID, a session ID, and a ranging parameter as herein described. Similarly as herein described, additional information can be included in the received signal. At 620, the direction and range of the transmitting device can be determined at a predetermined level of granularity based at least in part on the quality of the received signal. At this point methodology 600 can end. Further information contained in and/or related to the one or more received signals can facilitate further refinement of the direction and range determination or can provide additional information or privacy to user's of systems related to methodology 600.

Figure 7:
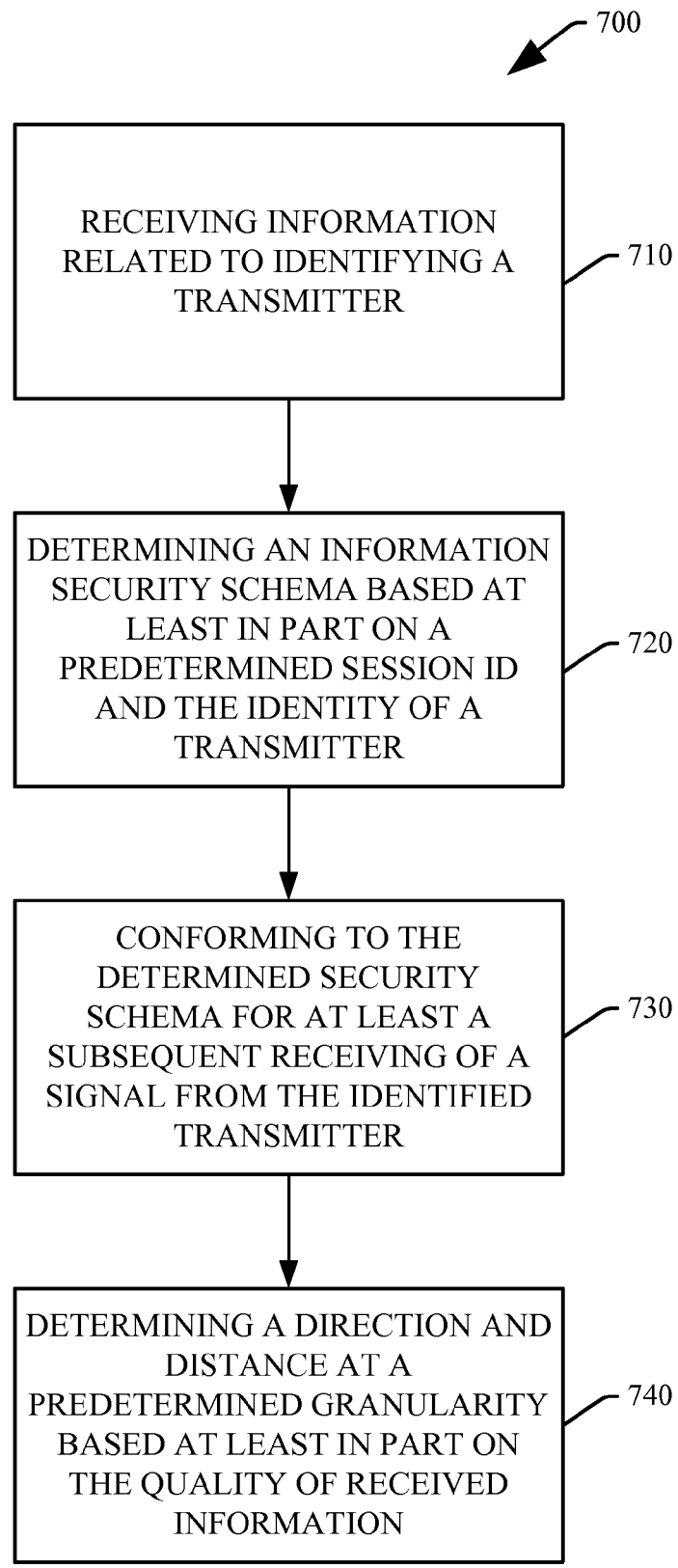
FIG. 7 illustrates a method to facilitate determining direction and range with a predetermined granularity.

FIG. 7 illustrates a method 700 to facilitate determining direction and range with a predetermined granularity in accordance with an aspect of the disclosed subject matter. At 710, information related to identifying a signal transmitter can be received. At 720, the receiving system can determine if a security schema is being employed by information related to the session ID and the user ID. At 730 the receiving device can be dynamically configured to conform to the identified security schema to facilitate continued reception of transmitted signals comprising a determination session (e.g., the session key functions to allow the receiving device to continue receiving understandable signals from the identified transmitting device to facilitate continued direction and range determinations). At 740 the direction and range of the transmitting device can be determined based at least in part on the received signals. At this point methodology 700 can end.

Figure 8:
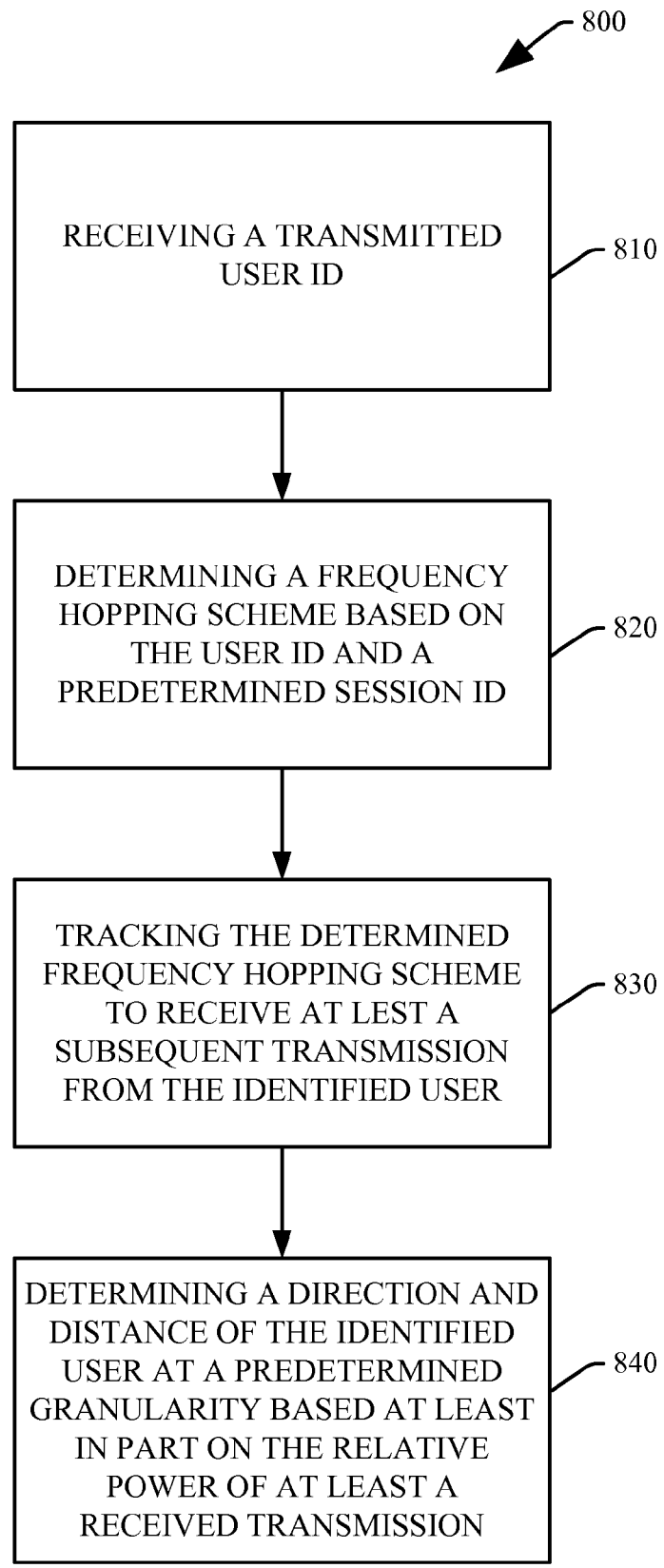
FIG. 8 illustrates a method to facilitate determining direction and range with a predetermined granularity.

FIG. 8 illustrates a method 800 to facilitate determining direction and range with a predetermined granularity in accordance with an aspect of the disclosed subject matter. At 810 a transmitted user id can be received. At 820, a frequency-hopping scheme can be determined based on the user ID and a predetermined session ID communicated to the receiving device. At 830, the frequency-hoping of the transmitting device can be tracked by the receiving device. At 840, the direction and range of the transmitting device can be determined based at least in part on the received signals. At this point methodology 800 can end.

Figure 9:
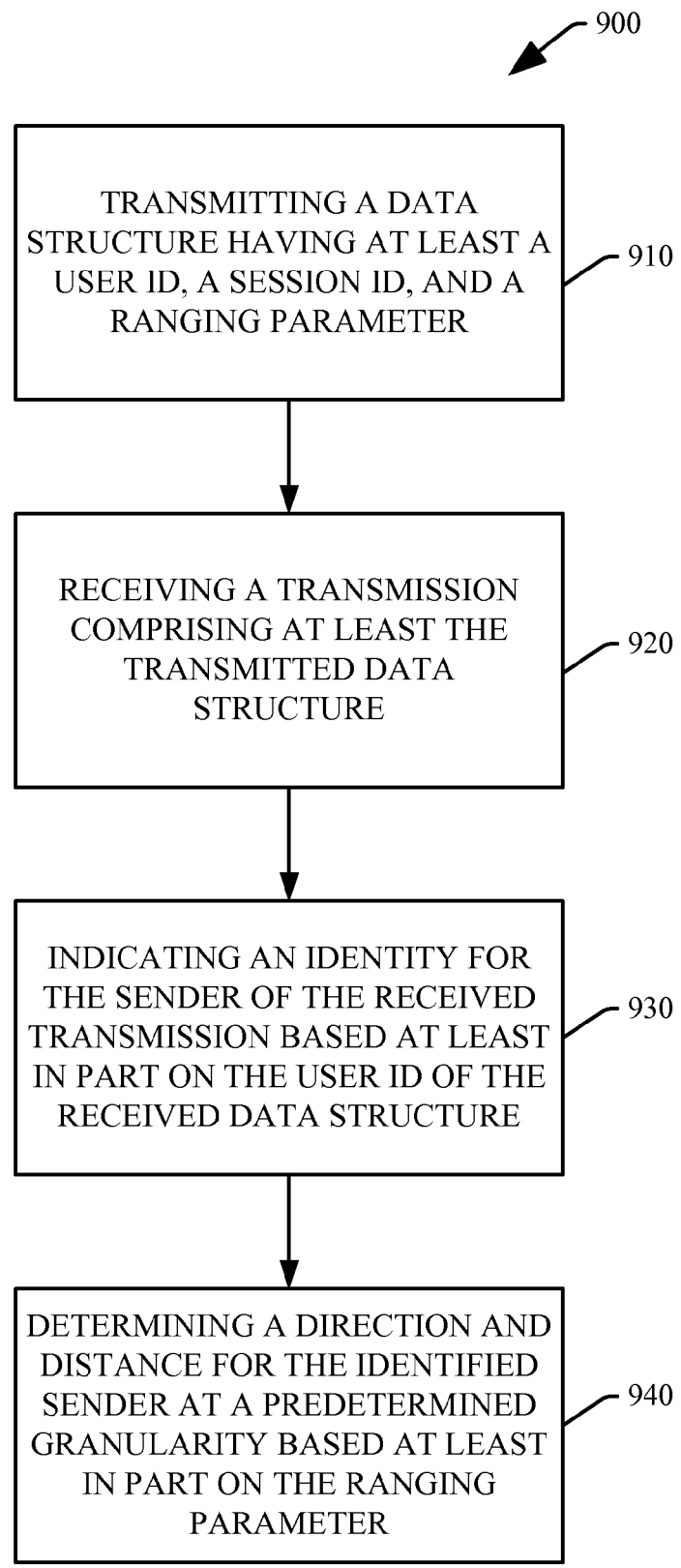
FIG. 9 illustrates a method to facilitate determining direction and range with a predetermined granularity.

FIG. 9 illustrates a method 900 to facilitate determining direction and range with a predetermined granularity in accordance with an aspect of the disclosed subject matter. At 910 a transmitting device can transmit a data structure having at least a user ID, a session ID, and a ranging parameter. At 920, the transmitted signal comprising the data structure can be received by a receiving device. At 930, an identity of the transmitting device can be indicated based at least in part on the user ID. At 940, the direction and range of the transmitting device can be determined based at least in part on the received signals. At this point methodology 900 can end.

Figure 10:
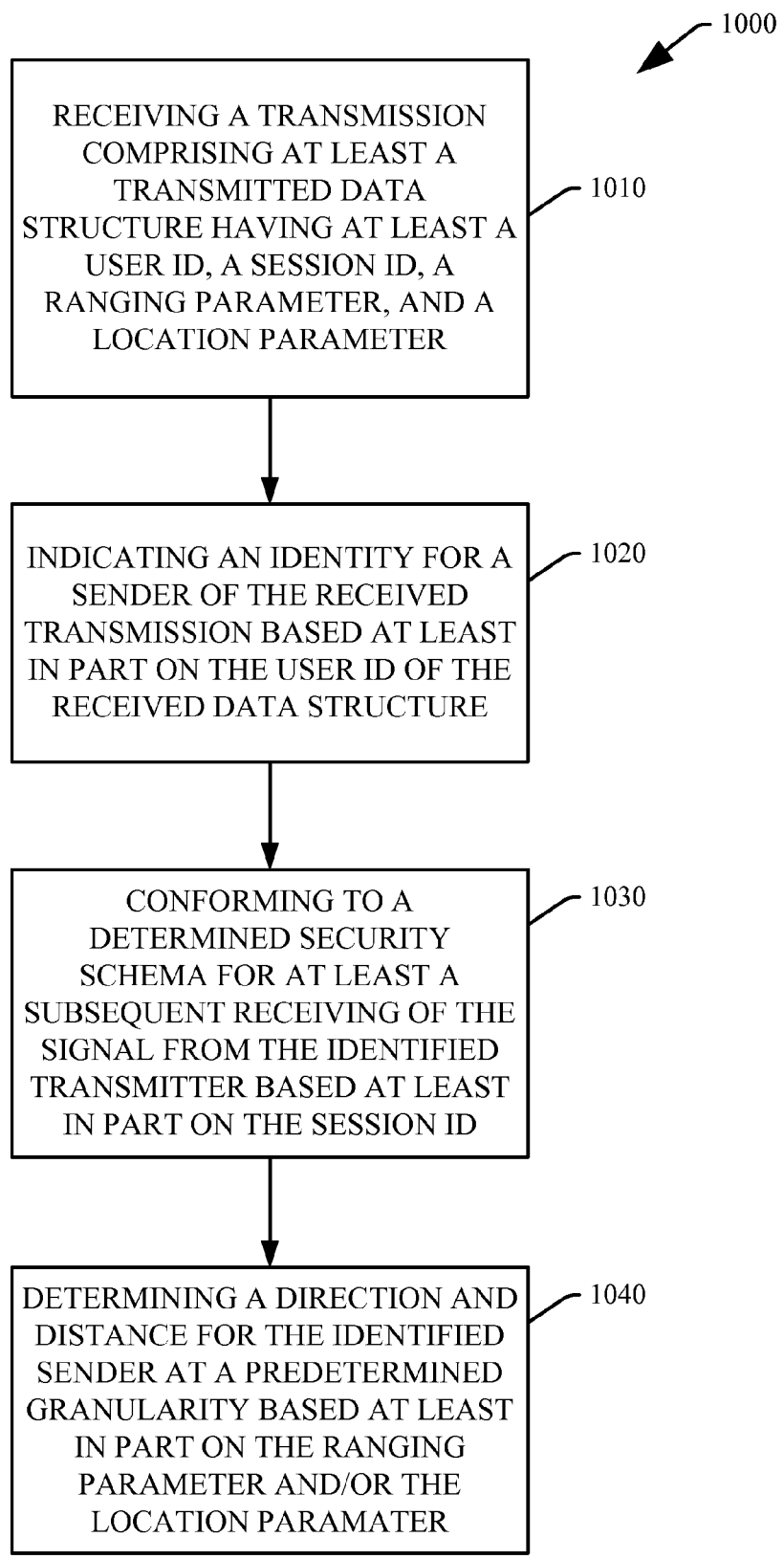
FIG. 10 illustrates a method to facilitate determining direction and range with a predetermined granularity.

FIG. 10 illustrates a method 1000 to facilitate determining direction and range with a predetermined granularity in accordance with an aspect of the disclosed subject matter. At 1010 a transmitting device can transmit a data structure having at least a user ID, a session ID, and a ranging parameter and further comprising additional data in the structure as herein described. At 1020, an identity of the transmitting device can be indicated based at least in part on the user ID. At 1030, the receiving device can conform to a security schema determined at least in part on the session ID. At 1040, the direction and range of the transmitting device can be determined based at least in part on the received signals. At this point methodology 1000 can end.

Figure 11:
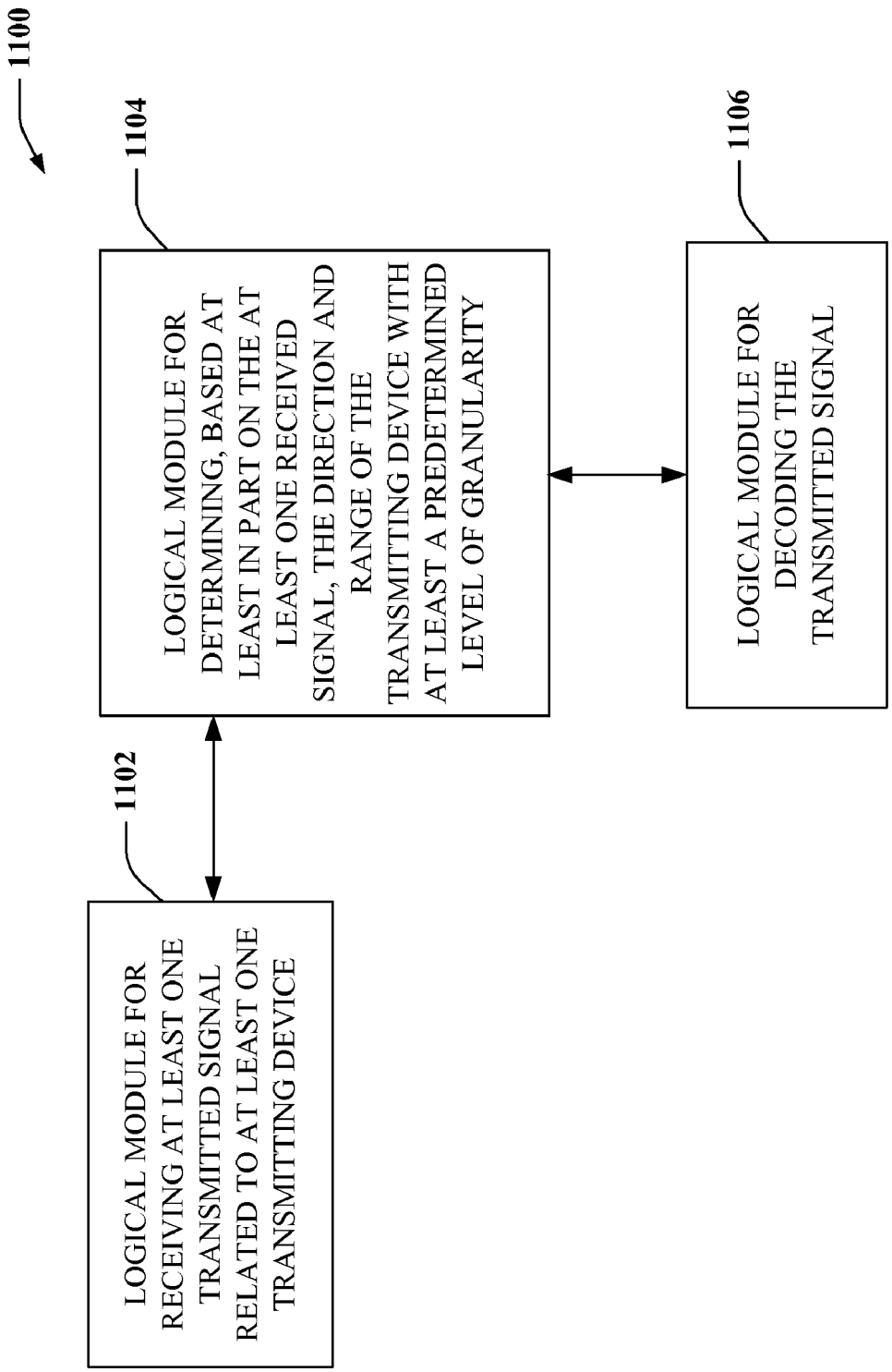
FIGS. 11 and 12 represent logical modules for wireless signal processing.
Figure 12:
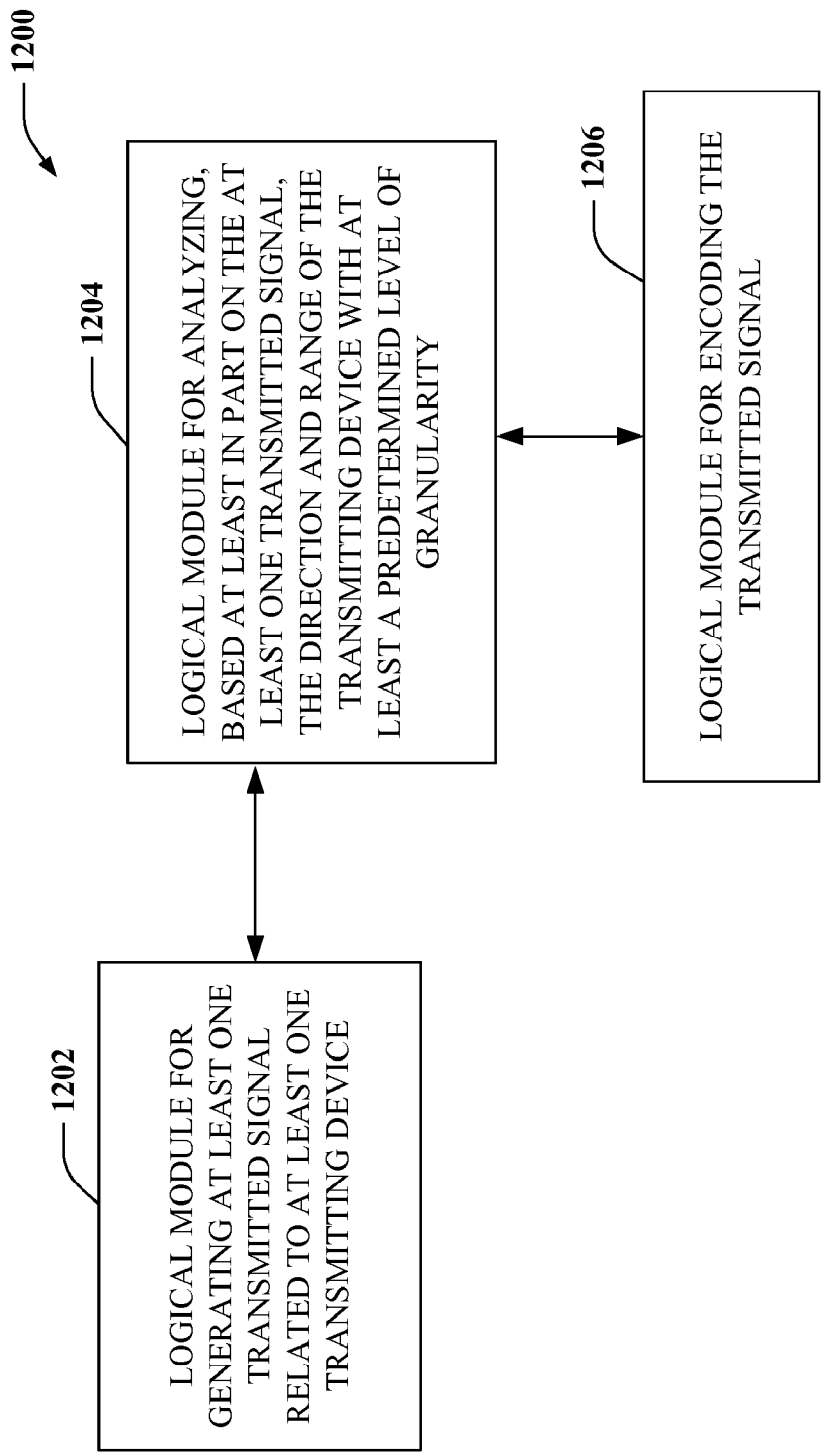

Turning now to FIGS. 11 and 12, a system is provided that relates to wireless signal processing. The systems are represented as a series of interrelated functional blocks, which can represent functions implemented by a processor, software, hardware, firmware, or any suitable combination thereof.

Referring to FIG. 11, a wireless communication system 1100 is provided. The system 1100 includes a logical module 1102 or means for receiving at least one transmitted signal related to at least one transmitting device. The system 1100 includes a logical module 1104 or means for determining, based at least in part on the at least one received signal, the direction and range of the transmitting device with at least a predetermined level of granularity. The system also includes a logical module 1106 or means for decoding the transmitted signal.

Referring to FIG. 12, a wireless communication system 1200 is provided. The system 1200 includes a logical module 1202 or means for generating at least one transmitted signal related to at least one transmitting device. The system 1200 includes a logical module 1204 or means for analyzing, based at least in part on the at least one transmitted signal, the direction and range of the transmitting device with at least a predetermined level of granularity. This includes a logical module 1206 or means for encoding the transmitted signal.

In one aspect, an apparatus to facilitate determining the direction and range of a transmitting device at a predetermined level of granularity by processing a transmitted signal is provided. The apparatus includes a receiving component for processing a beacon signal from a transmitting device; and an analyzer for determining a direction and range of the transmitting device based at least in part on an attenuation of the beacon signal, information contained in the beacon signal, or a context of the beacon signal. The beacon signal can be received directly by the receiving device without being relayed, retransmitted, or transported through a supporting communications network. The beacon signal can be encoded or encrypted, where transmitting the beacon signal can be via a frequency-hopping schema. A plurality of transmitted signals can be provided to facilitate determining a direction and range of a transmitting device, where the transmitted signal comprises a data structure related to determining a direction and range of a transmitting device. The data structure comprises a user ID, a session ID, and a ranging parameter, a state parameter, a location parameter, a transmitter context information component, or a reference signal component.

In another aspect, a processor configured for determining a direction and range of a transmitting device is provided. The processor includes a receiving component for detecting at least one transmitted signal related to at least one transmitting device; and a determination module for processing, based at least in part on the at least one received signal, the direction and range of the transmitting device with at least a predetermined level of granularity. The processing can be based at least in part on the attenuation of the received signal, information contained in the signal, or the context of the transmitted signal.

In another aspect, a computer program product configured for determining a direction and range of a transmitting device is provided. This includes a computer-readable medium comprising: a first set of codes for causing a computer to receive at least one transmitted signal related to at least one transmitting device; and a second set of codes for causing the computer to determine, based at least in part on the at least one received signal, the direction and range of the transmitting device with at least a predetermined level of granularity. The determination is based at least in part on the attenuation of the received signal, information contained in the signal, or the context of the transmitted signal.

In another aspect, a method for dynamically determining a direction and range of a transmitting device is provided. This includes receiving at least one transmitted signal related to at least one transmitting device; and determining a direction and range of the transmitting device with at least a predetermined level of granularity. Determining can be based at least in part on the attenuation of the received signal, information contained in the signal, or the context of the transmitted signal or based at least in part on a received signal that is encoded, encrypted, or a predetermined frequency-hopping process. The method includes generating a user id, a session id, or a range parameter to determine the direction or the range. This includes hashing a sequence with the user id, the session id, or the range parameter. The method includes determining a distance by analyzing a received signal with a predetermined power level and generating a key over a text messaging service to determine distance or range. The method includes generating a global positioning parameter, an inertial computation or position, or elevation information or generating relational positioning information to at least one other device or location. This includes generating multiple frequencies to determine a location or a range.

In another aspect, an apparatus to facilitate determining the direction and range of a transmitting device at a predetermined level of granularity by processing a transmitted signal is provided. The apparatus includes a transmitting component for generating a beacon signal from a transmitting device; and a security component to encode a direction and range of the transmitting device based at least in part on an attenuation of the beacon signal, information contained in the beacon signal, or a context of the beacon signal.

In yet another aspect, a processor configured for determining a direction and range of a transmitting device is provided. The processor includes a transmitter component for generating at least one transmitted signal related to at least one transmitting device; and a security component to encode the direction and range of the transmitting device with at least a predetermined level of granularity.

A computer program product configured for determining a direction and range of a transmitting device is provided. This includes a computer-readable medium comprising: a first set of codes for causing a computer to transmit at least one transmitted signal related to at least one transmitting device; and a second set of codes for causing the computer to determine, based at least in part on the at least one transmitted signal, the direction and range of the transmitting device with at least a predetermined level of granularity.

In another aspect, a method for dynamically determining a direction and range of a transmitting device is provided. The method includes generating at least one transmitted signal related to at least one transmitting device; and determining a direction and range of the transmitting device with at least a predetermined level of granularity. This can include at least one determination or transmitted signal, information. This can include a method for dynamically determining direction. This also includes at least one transmitted signal or information.

The various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. The processor and the storage medium may reside in an ASIC.

Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of codes and/or instructions on a machine readable medium and/or computer readable medium, which may be incorporated into a computer program product. The various illustrative logical blocks, modules, and circuits described in connection with the examples disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

In one or more aspects, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal. A terminal can also be called a system, device, subscriber unit, subscriber station, mobile station, mobile, mobile device, remote station, remote terminal, access terminal, user terminal, terminal, communication device, user agent, user device, or user equipment (UE). A wireless terminal may be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Moreover, various aspects are described herein in connection with a base station. A base station may be utilized for communicating with wireless terminal(s) and may also be referred to as an access point, a NodeB, or some other terminology.

The techniques described herein may be used for various wireless communication systems such as Code Division Multiple Access (CDMA), Time Division Multiple Access (TDMA), Frequency Division Multiple Access (FDMA), Orthogonal Frequency Division Multiple Access (OFDMA), Single Carrier Frequency Division Multiple Access (SC-FDMA or SCFDMA) and other systems. The terms "system" and "network" are often used interchangeably. A CDMA system may implement a radio technology such as Universal Terrestrial Radio Access (UTRA), Code Division Multiple Access 2000 (CDMA2000 or cdma2000®), etc. UTRA includes Wideband-CDMA (W-CDMA) and other variants of CDMA. CDMA2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20 (Mobile Broadband Wireless Access (MBWA)), Fast Low-latency Access with Seamless Handoff Orthogonal Multiplexing (FOFDM or Flash-OFDM®), etc. UTRA and E-UTRA are part of Universal Mobile Telecommunication System (UMTS). 3rd Generation Partnership Project (3GPP) Long Term Evolution (LTE) is an upcoming release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). CDMA2000 and UMB are described in documents from an organization named "3rd Generation Partnership Project 2" (3GPP2).

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Artificial intelligence based systems (e.g., explicitly and/or implicitly trained classifiers) can be employed in connection with performing inference and/or probabilistic determinations and/or statistical-based determinations as in accordance with one or more aspects of the disclosed subject matter as described herein. As used herein, the term "inference," "infer" or variations in form thereof refers generally to the process of reasoning about or inferring states of the system, environment, and/or user from a set of observations as captured by way of events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification schemes and/or systems (e.g., support vector machines, neural networks, expert systems, Bayesian belief networks, fuzzy logic, data fusion engines . . . ) can be employed in connection with performing automatic and/or inferred action in connection with the disclosed subject matter.

For example, an artificial intelligence based system can evaluate current or historical evidence associated with transmitted direction and ranging signals (e.g., historical data related to the accuracy of direction and ranging information, contextual attenuation in particular environments and/or locations, standardization information, training, etc., . . . ) and based in part in such evaluation, can render an inference, based in part on probability, regarding, for instance, the direction and range of a transmitter for a received signal under the current known or inferred conditions, etc. For example, where historically the distance is double for a received signal in the local mall, the receiving device can infer that distances should be doubled when signals are received in the context of the local mall based on an inference that this will be more accurate. One of skill in the art will appreciate that intelligent and/or inferential systems can facilitate further optimization of the disclosed subject matter and such inferences can be based on a large plurality of data and variables all of which are considered within the scope of the various embodiments of the subject disclosure.

For instance, one of skill in the art will appreciate that an intelligent component (not illustrated) can be and/or can be part of an intelligence based system and can be included in systems disclosed herein to facilitate determining inferences related to determining the direction and range of a transmitting UE or mobile device. For example, an inference can be made, based at least in part on current and/or historic data access, that where a signal is severely attenuated and also contains location context information for a nearby shop, that it is likely that the location of the transmitting device is near the shop despite the suggested greater range based solely on the attenuated signal. Similarly, an inference can be made that the transmitting device is distant when historically the transmitting device has actually been distant despite the signal also containing information that the transmitting device is near a shop that is close. One of skill in the art will appreciate that the number of inferences that can be made is nearly limitless and that all such inferences are to be considered within the scope of the disclosed subject matter.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. The previous description of the disclosed examples is provided to enable any person skilled in the art to make or use the present invention. Various modifications to these examples will be readily apparent to those skilled in the art, and the generic principles defined herein may be applied to other examples without departing from the spirit or scope of the invention. Thus, the present invention is not intended to be limited to the examples shown herein but is to be accorded the widest scope consistent with the principles and novel features disclosed herein.

What is claimed is:

1. An apparatus to facilitate determining direction and range of a transmitting device at a predetermined level of granularity, the apparatus comprising:
   a receiving component for processing a beacon signal from the transmitting device; and
   an analyzer for determining a direction and range of the transmitting device based at least in part on an attenuation of the beacon signal, an information contained in the beacon signal, or a context of the beacon signal and for refining the determined direction and range of the transmitting device based, at least in part, on an indication provided in the beacon signal of a position of the transmitting device relative to a source of another beacon signal.

2. The apparatus of claim 1, where the beacon signal is received directly by a receiving device without being relayed, retransmitted, or transported through a supporting communications network.

3. The apparatus of claim 1, where the beacon signal is encoded or encrypted.

4. The apparatus of claim 1, where transmitting the beacon signal is via a frequency-hopping schema.

5. The apparatus of claim 1, comprising a plurality of transmitted signals to facilitate determining a direction and range of the transmitting device.

6. The apparatus of claim 5, where at least one of the plurality of transmitted signal comprises a data structure related to determining a direction and range of the transmitting device.

7. The apparatus of claim 6, where the data structure comprises a user ID, a session ID, and a ranging parameter.

8. The apparatus of claim 7, wherein the data structure further comprises a state parameter, a location parameter, a transmitter context information component, or a reference signal component.

9. A processor configured for determining direction and range of a transmitting device, comprising:
   a receiving component for detecting at least one beacon signal transmitted by the transmitting device; and
   a determination module for processing, based at least in part on the at least one beacon signal, the direction and range of the transmitting device with at least a predetermined level of granularity; and
   a module for refining the determined direction and range of the transmitting device based, at least in part, on an indication provided in the at least one beacon signal of a position of the transmitting device relative to a source of another beacon signal.

10. The processor of claim 9, where the processing is based at least in part on an attenuation of the at least one beacon signal, an information contained in the at least one beacon signal, or a context of the at least one beacon signal.

11. A computer program product configured for determining direction and range of a transmitting device, comprising:
   a computer-readable medium comprising:
      a first set of codes for causing a computer to receive at least one beacon signal transmitted by the transmitting device; and
      a second set of codes for causing the computer to determine, based at least in part on the at least one beacon signal, the direction and range of the transmitting device with at least a predetermined level of granularity; and
      a third set of codes for causing the computer to refine the determined direction and range of the transmitting device based, at least in part, on an indication provided in the at least one beacon signal of a position of the transmitting device relative to a source of another beacon signal.

12. The computer program product of claim 11, wherein the second set of codes is based at least in part on an attenuation of the at least one beacon signal, an information contained in the at least one beacon signal, or a context of the at least one beacon signal.

13. An apparatus configured for determining direction and range of a transmitting device, comprising:
   means for receiving at least one beacon signal transmitted by the transmitting device;
   means for determining, based at least in part on the at least one beacon signal, the direction and range of the transmitting device with at least a predetermined level of granularity;
   means for refining the determined direction and range of the transmitting device based, at least in part, on an indication provided in the at least one beacon signal of a position of the transmitting device relative to a source of another beacon signal; and
   means for decoding the at least one beacon signal.

14. The apparatus of claim 13, wherein the means for determining is based at least in part on an attenuation of the at least one beacon signal, an information contained in the at least one beacon signal, or a context of the at least one beacon signal.

15. A method for dynamically determining direction and range of a transmitting device, comprising:

receiving at least one beacon signal transmitted from the transmitting device;

determining, based at least in part on the at least one beacon signal, a direction and range of the transmitting device with at least a predetermined level of granularity; and refining the determined direction and range of the transmitting device based, at least in part, on an indication provided in the at least one beacon signal of a position of the transmitting device relative to a source of another beacon signal.

16. The method of claim 15, wherein determining is based at least in part on an attenuation of the at least one beacon signal, information contained in the at least one beacon signal, or a context of the at least one beacon signal.

17. The method of claim 16, wherein determining is based at least in part on a received signal that is encoded, encrypted, or a predetermined frequency-hopping process.

18. The method of claim 15, further comprising generating a user id, a session id, or a range parameter to determine a direction or a range.

19. The method of claim 18, further comprising hashing a sequence with the user id, the session id, or the range parameter.

20. The method of claim 15, further comprising determining a distance by analyzing a received signal with a predetermined power level.

21. The method of claim 15, further comprising generating a key over a text messaging service to determine distance or range.

22. The method of claim 15, further comprising generating a global positioning parameter, an inertial computation or position, or elevation information.

23. The method of claim 22, further comprising generating relational positioning information to at least one other device or location.

24. The method of claim 15, further comprising generating multiple frequencies to determine a location or a range.

25. A computer program product configured for determining a direction and range of a transmitting device, comprising:
a computer-readable medium comprising:
a first set of codes for causing a computer to transmit at least one beacon signal related to the transmitting device; and
a second set of codes for causing the computer to determine, based at least in part on the at least one beacon signal, the direction and range of the transmitting device with at least a predetermined level of granularity; and
a third set of codes for causing the computer to refine the determined direction and range of the transmitting device based, at least in part, on an indication provided in the at least one beacon signal of a position of the transmitting device relative to a source of another beacon signal.

26. The computer program product of claim 25, wherein the second set of codes is based at least in part on an attenuation of a received signal, an information contained in the received signal, or a context of the received signal.

27. An apparatus configured for determining a direction and range of a transmitting device, comprising:
means for generating at least one beacon signal related to the transmitting device;
means for analyzing, based at least in part on the at least one beacon signal, the direction and range of the transmitting device with at least a predetermined level of granularity;
means for refining the determined direction and range of the transmitting device based, at least in part, on an indication provided in the at least one beacon signal of a position of the transmitting device relative to a source of another beacon signal; and
means for encoding the at least one beacon signal.

28. The apparatus of claim 27, where the direction and the range are based on an attenuation of the at least one beacon signal, an information contained in the at least one beacon signal, or a context of the at least one beacon signal.

29. A method for dynamically determining a direction and range of a transmitting device, comprising:
generating at least one beacon signal related the transmitting device;
determining, based at least in part on the at least one beacon signal, a direction and range of the transmitting device with at least a predetermined level of granularity; and
refining the determined direction and range of the transmitting device based, at least in part, on an indication provided in the at least one beacon signal of a position of the transmitting device relative to a source of another beacon signal.

30. The method of claim 29, wherein determining is based at least in part on a received signal that is encoded, encrypted, or a predetermined frequency-hopping process.

31. The method of claim 29, further comprising generating a user id, a session id, or a range parameter to determine the direction or the range.

32. The method of claim 31, further comprising hashing a sequence with the user id, the session id, or the range parameter.

33. The method of claim 29, further comprising determining a distance by analyzing a received signal with a predetermined power level.

* * * * *